United States Patent
Wu

(10) Patent No.: US 11,645,764 B2
(45) Date of Patent: May 9, 2023

(54) IMAGE DIFFERENCE-BASED METHOD AND SYSTEM FOR TRACKING A TRANSPARENT OBJECT

(71) Applicant: QINGDAO PICO TECHNOLOGY CO., LTD., Qingdao (CN)

(72) Inventor: Tao Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/881,557

(22) Filed: Aug. 4, 2022

(65) Prior Publication Data

US 2022/0383513 A1  Dec. 1, 2022

Related U.S. Application Data

(63) Continuation of application No. PCT/CN2021/122660, filed on Oct. 8, 2021.

(30) Foreign Application Priority Data

May 6, 2021  (CN) .......................... 202110492263.9

(51) Int. Cl.
  *G06T 7/246* (2017.01)
  *G06T 7/73* (2017.01)
(52) U.S. Cl.
  CPC .............. *G06T 7/246* (2017.01); *G06T 7/73* (2017.01); *G06T 2207/10048* (2013.01)
(58) Field of Classification Search
  CPC ......... G06T 7/246; G06T 7/254; G06T 7/292; G06T 7/30; G06T 7/33; G06T 7/70;
  (Continued)

(56) References Cited

U.S. PATENT DOCUMENTS

| 2021/0027479 A1* | 1/2021 | Price et al. | ............ H04N 5/247 |
| 2022/0379475 A1* | 12/2022 | Tang et al. | ............... G06N 3/08 |

FOREIGN PATENT DOCUMENTS

| CN | 108010085 A | 5/2018 | ............... G06T 7/80 |
| CN | 110245566 A | 9/2019 | ............... G06K 9/00 |

(Continued)

OTHER PUBLICATIONS

First Office Action dated Jul. 5, 2022 in Chinese Application No. 202110492263.9, with English translation (12 pages).

(Continued)

*Primary Examiner* — Andrew W Johns

(57) ABSTRACT

Provided are an image difference-based method and system for tracking a transparent object, first by training a convolutional neural network based on sample data, to generate a transparent object detection model; then inputting visible light image data acquired in real time and infrared thermal image data acquired in real time to the transparent object detection model, to acquire a visible light image transparent pixel identifier and an infrared thermal image transparent pixel identifier; then calculating three-dimensional point cloud information of each pixel marked by the infrared thermal image transparent pixel identifier, in the infrared thermal image data, wherein the three-dimensional point cloud information is in a coordinate system of an infrared thermal imaging camera; wherein the infrared thermal imaging camera is a camera for acquiring the infrared thermal image data, thereby acquiring, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object.

14 Claims, 1 Drawing Sheet

(58) Field of Classification Search
CPC ... G06T 7/73; G06T 7/97; G06T 2207/20084; G06V 10/82; G06N 3/02; G06N 3/08
See application file for complete search history.

(56) References Cited

FOREIGN PATENT DOCUMENTS

| CN | 110428008 A | | 11/2019 | ............... G06K 9/62 |
|---|---|---|---|---|
| CN | 111027541 A | | 4/2020 | ............... G06K 9/32 |
| CN | 111612765 A | | 9/2020 | |
| CN | 111696140 A | | 9/2020 | ............. G06T 7/269 |
| CN | 112242008 A | * | 1/2021 | ........... G06N 3/0454 |
| CN | 112242008 A | | 1/2021 | ............. G06T 19/00 |
| CN | 113240741 A | | 8/2021 | ............... G06T 7/73 |
| WO | WO2020070261 A1 | | 4/2020 | ............. G06F 3/042 |

OTHER PUBLICATIONS

Xituan Lu et al., "Design of a Device for Fusing the Infrared Target Image with Visible Image from UAV," Electronics Optics & Control, vol. 27, No. 5, pp. 74-79, May 2020, with English translation (8 pages).
International Search Report dated Jan. 30, 2022 in International Application No. PCT/CN2021/122660, with English translation (7 pages).
Notice of Allowance dated Jan. 20, 2023 in Chinese Application No. 202110492263.9, with English translation (8 pages).

* cited by examiner

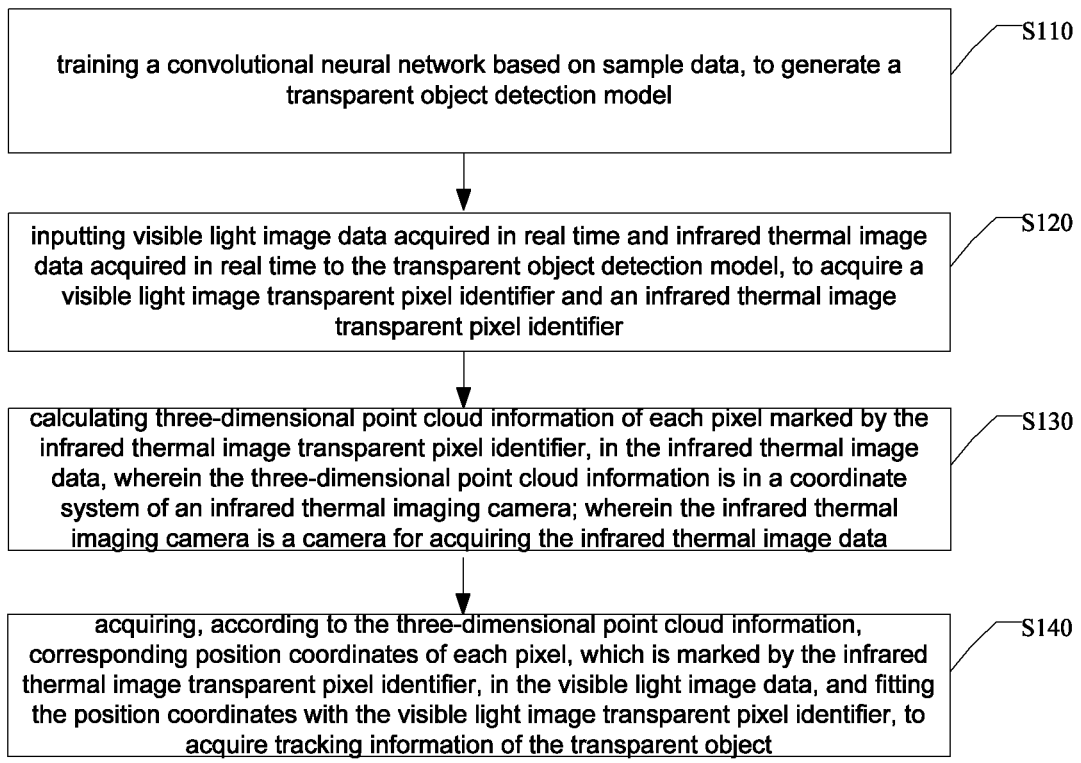
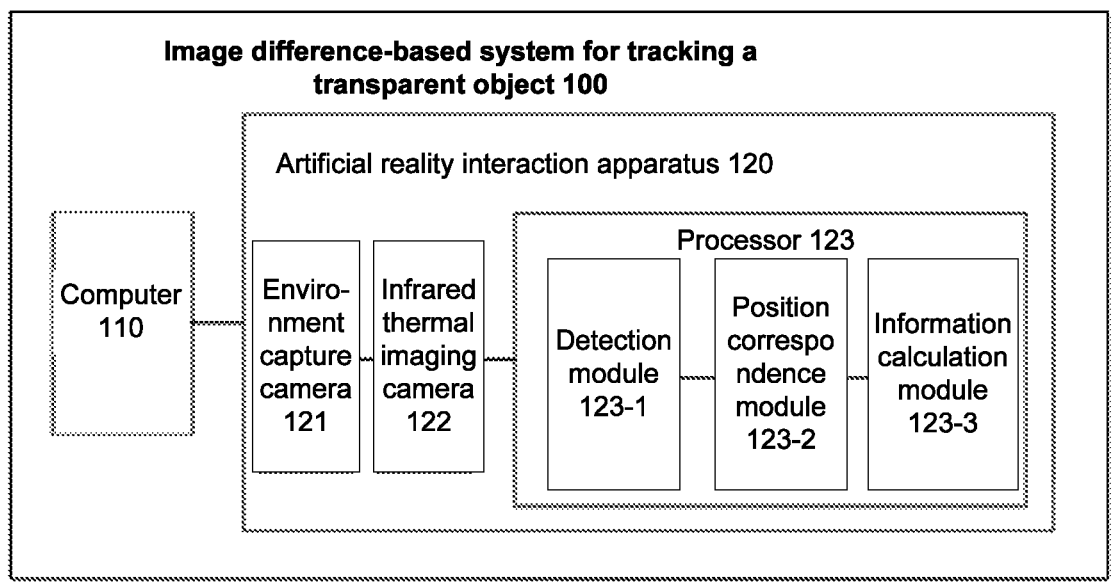

IMAGE DIFFERENCE-BASED METHOD AND SYSTEM FOR TRACKING A TRANSPARENT OBJECT

CROSS-REFERENCE TO RELATED APPLICATION

The present disclosure is a continuation application of PCT Application No PCT/2021/122660 filed on Oct. 8, 2021, which claims priority to Chinese Patent Application No. 202110492263.9, filed to the China National Intellectual Property Administration on May 6, 2021 and entitled "Image Difference-Based Method and System for Tracking Transparent Object", the disclosure of which is incorporated herein by reference in its entirety.

TECHNICAL FIELD

The present disclosure relates to the technical field of virtual reality, and more particularly, to an image difference-based method and system for tracking a transparent object.

BACKGROUND

Object detection is widely applied in fields of virtual reality (VR), augmented reality (AR) and mixed reality (MR). For example, in interaction of multi-task office systems of VR/MR, in a VR see through mode, multiple virtual task windows need to be opened to simulate multiple computer screen displays in a real environment, and to simultaneously display and process multiple tasks. These virtual task windows need to perform superposing and interaction with an office desktop in the real environment in the see through mode, so as to simulate multiple display devices placed on the office desktop in the real environment. However, for the purpose above, a computer vision processing algorithm, an image processing method and a graphic rendering technology are all required to solve the superposition of the multiple virtual task windows on the office desktop in the real environment, thereby achieving one-to-one high-precision reduction.

For another example, in interaction of scenes in an AR field, it is often required to detect some key objects in a real environment, for example, some common objects such as a desk, a stool, and a sofa. On the basis of the computer vision processing algorithm, the image processing method, and the graphic rendering technology, some virtual-reality interaction with these objects in the real environment is achieved by AR glasses worn by a user. In general, artificial reality interaction is a form of reality that is adjusted in certain way before presenting to the user, which may include for example, VR, AR, MR or some combinations and/or derivatives thereof.

Currently, in an artificial reality system, object detection is mainly performed based on a visible light camera, an infrared camera, or a structured light-based depth camera, or a time-of-flight-based depth camera, or cooperation of some of them; however, due to limitation of imaging technology, some objects are still difficult to be detected, or have a low detection precision, in particular, transparent objects, such as a glass door in a room, a glass cup on a tea table, or for another example, a glass table, they may fail to be detected or distinguished, thereby seriously affecting user experiences of some interesting virtual and real interactions of the artificial reality system.

Therefore, there is an urgent need for a method and a system which can high-precisely detect and extract transparent objects in a scene.

SUMMARY

In view of the described problem, the object of some embodiments of the present disclosure is to provide an image difference-based method and system for tracking a transparent object, so as to solve the problem in a current artificial reality system that some objects are difficult to be detected or have a low detection precision, and in particular, transparent objects which may fail to be detected or distinguished, thereby improving the user experiences of some interesting virtual and real interactions of the artificial reality system.

The image difference-based method for tracking a transparent object provided in some embodiments of the present disclosure includes:

training a convolutional neural network based on sample data, to generate a transparent object detection model; inputting visible light image data acquired in real time and infrared thermal image data acquired in real time to the transparent object detection model, to acquire a visible light image transparent pixel identifier and an infrared thermal image transparent pixel identifier; calculating three-dimensional point cloud information of each pixel marked by the infrared thermal image transparent pixel identifier, in the infrared thermal image data, wherein the three-dimensional point cloud information is in a coordinate system of an infrared thermal imaging camera; wherein the infrared thermal imaging camera is a camera for acquiring the infrared thermal image data; and acquiring, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object.

Preferably, the sample data is data collected by a head-mounted display, and the sample data includes visible light image data and infrared thermal image data.

Preferably, the step of inputting the visible light image data and the infrared thermal image data to the transparent object detection model, to acquire the visible light image transparent pixel identifier and the infrared thermal image transparent pixel identifier includes: detecting and determining each pixel in the visible light image data and each pixel in the infrared thermal image data based on the transparent object detection model, and if the pixel in the visible light image data and the pixel in the infrared thermal image data are determined as transparent object pixels, marking a transparent pixel identifier on the transparent object pixels; wherein the transparent pixel identifier on the visible light image data is the visible light image transparent pixel identifier; and the transparent pixel identifier on the infrared thermal image data is the infrared thermal image transparent pixel identifier.

Preferably, before acquiring, according to the three-dimensional point cloud information, corresponding position coordinates of each pixel marked by the infrared thermal image transparent pixel identifier in the visible light image data, the method further includes:

acquiring calibration parameters between an environment capture camera and the infrared thermal imaging camera by camera calibration; wherein the environment capture camera is a camera for acquiring the visible light image data.

Preferably, the step of acquiring, according to the three-dimensional point cloud information, corresponding position coordinates of each pixel, which is marked by the infrared thermal image transparent pixel identifier, in the visible light image data includes:

acquiring a position relationship between each pixel marked by the infrared thermal image transparent pixel identifier and the infrared thermal imaging camera according to the three-dimensional point cloud information; acquiring a correspondence matrix between each pixel marked by the infrared thermal image transparent pixel identifier and the environment capture camera according to the position relationship and the calibration parameters, and acquiring three-dimensional information of the visible light image data in a coordinate system of the environment capture camera; and determining the position coordinates of each pixel, which is marked by the infrared thermal image transparent pixel identifier, in the visible light image data according to the correspondence matrix and the three-dimensional information.

Preferably, after fitting the position coordinates with the visible light image transparent pixel identifier, to acquire tracking information of the transparent object, the method further includes: locking a target region of the transparent object based on the tracking information; and performing rendering and superposing on the target region to complete tracking of the transparent object.

Some embodiments of the present disclosure further provide an image difference-based system for tracking a transparent object, which implements the described image difference-based method for tracking a transparent object, and includes a computer and an artificial reality interaction apparatus; wherein the computer is configured to train a convolutional neural network based on sample data, to generate a transparent object detection model; and the artificial reality interaction apparatus includes an environment capture camera, an infrared thermal imaging camera and a processor, wherein the environment capture camera and the infrared thermal imaging camera are respectively configured to acquire visible light image data and infrared thermal image data in real time; the processor includes a detection module, a position correspondence module and an information calculation module, wherein the detection module stores the transparent object detection model, and the detection module is configured to input the visible light image data and the infrared thermal image data to the transparent object detection model, to acquire a visible light image transparent pixel identifier and an infrared thermal image transparent pixel identifier; the position correspondence module is configured to calculate three-dimensional point cloud information of each pixel marked by the infrared thermal image transparent pixel identifier, in the infrared thermal image data, wherein the three-dimensional point cloud information is in a coordinate system of an infrared thermal imaging camera; and the information calculation module is configured to acquire, according to the three-dimensional point cloud information, corresponding position coordinates of each pixel, which is marked by the infrared thermal image transparent pixel identifier, in the visible light image data, and fit the position coordinates with the visible light image transparent pixel identifier, to acquire tracking information of the transparent object.

Preferably, a coincidence degree of capture fields of view between the environment capture camera and the infrared thermal imaging camera is at least 80%, and the environment capture camera is in frame synchronization with the infrared thermal imaging camera frame.

Preferably, the environment capture camera is a visible light camera.

It can be determined from the described technical solutions that in the image difference-based method and system for tracking a transparent object provided in some embodiments of the present disclosure, first by training a convolutional neural network based on sample data, to generate a transparent object detection model; then inputting visible light image data acquired in real time and infrared thermal image data acquired in real time to the transparent object detection model, to acquire a visible light image transparent pixel identifier and an infrared thermal image transparent pixel identifier; then calculating three-dimensional point cloud information of each pixel marked by the infrared thermal image transparent pixel identifier, in the infrared thermal image data, wherein the three-dimensional point cloud information is in a coordinate system of an infrared thermal imaging camera, thereby acquiring, acquiring, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object; in this way, as the visible light image data and the infrared thermal image data are from different image features of the same scene and the same object, high-precision detection is achieved by acquiring two different image features and detecting a difference between the two features, so as to extract position information of the transparent object in a scene more precisely.

BRIEF DESCRIPTION OF THE DRAWINGS

With reference to the following content of the description in conjunction with the accompanying drawings, and along with comprehensive understanding of some embodiments of the present disclosure, other objects and results of some embodiments of the present disclosure will become more apparent and more readily understood. In the drawings:

FIG. 1 is a flowchart of an image difference-based method for tracking a transparent object according to embodiments of the present disclosure; and FIG. 2 is a schematic diagram of an image difference-based system for tracking a transparent object according to embodiments of the present disclosure.

DETAILED DESCRIPTION OF THE EMBODIMENTS

Currently, in an artificial reality system, object detection is mainly performed by using a visible light camera, an infrared camera, or a structured light-based depth camera, or a time-of-flight-based depth camera, or cooperation of some of them; however, due to limitation of imaging technology, some objects are still difficult to be detected, or have a low detection precision, in particular, transparent objects, such as a glass door in a room, such as a glass cup on a tea table, or for another example, a glass table, they may fail to be detected or distinguished, thereby seriously affecting user experiences of some interesting virtual and real interactions of the artificial reality system.

In view of the described problem, the present disclosure provides an image difference-based method and system for tracking a transparent object. Hereinafter, specific embodiments of the present disclosure will be described in detail in conjunction with the accompanying drawings.

In order to explain a light field sensing-based eyeball tracking system provided by some embodiments of the present disclosure, FIG. 1 provides exemplary representation of the image difference-based method for tracking a transparent object in embodiments of the present disclosure; and FIG. 2 provides exemplary representation of the image difference-based system for tracking a transparent object in embodiments of the present disclosure.

The following description of exemplary embodiments is merely illustrative in nature and is in no way intended to limit some embodiments of the present disclosure and any applications or uses thereof. Techniques and devices known to a person of ordinary skill in the relevant art may not be discussed in detail, but the techniques and devices shall be considered as a part of the description, where appropriate.

As shown in FIG. 1, the image difference-based method for tracking a transparent object in embodiments of the present disclosure includes:

S110: training a convolutional neural network based on sample data, to generate a transparent object detection model;

S120: inputting visible light image data acquired in real time and infrared thermal image data acquired in real time to the transparent object detection model, to acquire a visible light image transparent pixel identifier and an infrared thermal image transparent pixel identifier;

S130: calculating three-dimensional point cloud information of each pixel marked by the infrared thermal image transparent pixel identifier, in the infrared thermal image data, wherein the three-dimensional point cloud information is in a coordinate system of an infrared thermal imaging camera; wherein the infrared thermal imaging camera is a camera for acquiring the infrared thermal image data; and S140: acquiring, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object.

In the embodiment as shown in FIG. 1, step S110 is training a convolutional neural network based on sample data, to generate a transparent object detection model; wherein the sample data is data collected by a head-mounted display, and the sample data includes the visible light image data and the infrared thermal image data. The specific number of pieces of the sample data is not specifically limited. In this embodiment, the number of pieces of the sample data is about 3 million. A high-precision transparent object detection model is trained on the basis of a convolutional neural network based on data annotation and data cleaning.

In the embodiment as shown in FIG. 1, step S120 is acquiring visible light image data and infrared thermal image data in real time; and then inputting the visible light image data and the infrared thermal image data acquired in real time to the transparent object detection model, to acquire a visible light image transparent pixel identifier and an infrared thermal image transparent pixel identifier; wherein each pixel in the visible light image data and each pixel in the infrared thermal image data are detected and determined based on the transparent object detection model, and if the pixel in the visible light image data and the pixel in the infrared thermal image data are determined as transparent object pixels, a transparent pixel identifier is marked on the transparent object pixels; wherein the transparent pixel identifier on the visible light image data is the visible light image transparent pixel identifier;

the transparent pixel identifier on the infrared thermal image data is the infrared thermal image transparent pixel identifier; and the transparent pixel identifiers are marked as 1, and pixels other than the transparent pixel identifiers are marked as 0.

In the embodiment as shown in FIG. 1, step S130 is calculating three-dimensional point cloud information of each pixel marked by the infrared thermal image transparent pixel identifier of the infrared thermal image data in a coordinate system of an infrared thermal imaging camera; the infrared thermal imaging camera is a camera for acquiring the infrared thermal image data, wherein before step S130, the method further includes:

S130-1: acquiring calibration parameterss between an environment capture camera and the infrared thermal imaging camera by camera calibration; wherein the environment capture camera is a camera for acquiring the visible light image data. This step may be performed at any time before step S130, and may even be acquired immediately after the two cameras are mounted, and the data remains unchanged in cases where positions of the two cameras do not change, so that the calibration parameters can be used all the time.

The step of acquiring, according to the three-dimensional point cloud information, corresponding position coordinates of each pixel marked by the infrared thermal image transparent pixel identifier in the visible light image data includes:

S131: acquiring a position relationship between each pixel marked by the infrared thermal image transparent pixel identifier and the infrared thermal imaging camera according to the three-dimensional point cloud information;

S132: acquiring a correspondence matrix between each pixel marked by the infrared thermal image transparent pixel identifier and the environment capture camera according to the position relationship and the calibration parameters, and acquiring three-dimensional information of the visible light image data in a coordinate system of the environment capture camera; and S133: determining the position coordinates of each pixel, which is marked by the infrared thermal image transparent pixel identifier, in the visible light image data according to the correspondence matrix and the three-dimensional information.

Step S140 is acquiring, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object, so as to acquire tracking information of the transparent object. That is, by directly acquiring the visible light image transparent pixel identifier from a light image, so as to preliminarily confirm a region of the transparent object, then deriving to correspond to a visible light image based on the infrared thermal image transparent pixel identifier, and by comparing a first region covered by the visible light image transparent pixel identifier with a second region covered by position coordinates of each pixel marked by the infrared thermal image transparent pixel identifier in the visible light image data, so as to fit a portion where the two regions overlap as a deep portion, and fit a portion only appearing in the first region or the second region once as a shallow portion, and then the position where the transparent object is located can be estimated accurately according to the deep portion and the shallow portion. That is, high-precision detection is achieved by detecting a difference between two features, so as to extract position information of the transparent object in a scene more precisely.

In addition, after step S140, the method further includes step S150:

S151: locking a target region of the transparent object based on the tracking information; and S152: performing rendering and superposing on the target region to complete tracking of the transparent object.

In this way, based on a computer vision processing algorithm, an image processing method and a graphic rendering technology, the transparent object is rendered and superposed in the target region, thereby achieving a one-to-one high-precision reduction of a virtual reality scene.

As stated above, in the image difference-based method for tracking a transparent object provided in some embodiments of the present disclosure, first by training a convolutional neural network based on sample data, to generate a transparent object detection model; then inputting visible light image data and infrared thermal image data acquired in real time to the transparent object detection model, to acquire a visible light image transparent pixel identifier and an infrared thermal image transparent pixel identifier; then calculating three-dimensional point cloud information of each pixel marked by the infrared thermal image transparent pixel identifier of the infrared thermal image data in a coordinate system of an infrared thermal imaging camera, thereby acquiring, according to the three-dimensional point cloud information, corresponding position coordinates of each pixel marked by the infrared thermal image transparent pixel identifier in the visible light image data, and fitting the position coordinates with the visible light image transparent pixel identifier, so as to acquire tracking information of the transparent object, and thus based on a computer vision processing algorithm, an image processing method and a graphic rendering technology, a transparent object is rendered and superposed according to the tracking information, thereby achieving a one-to-one high-precision reduction of a virtual reality scene.

As shown in FIG. 2, some embodiments of the present disclosure further provide an image difference-based system 100 for tracking a transparent object, which implements the described image difference-based method for tracking a transparent object, comprising: a computer 110 and an artificial reality interaction apparatus 120; wherein the computer 110 is configured to train a convolutional neural network based on sample data, to generate a transparent object detection model; and the artificial reality interaction apparatus 120 includes an environment capture camera 121, an infrared thermal imaging camera 122 and a processor 123, wherein the environment capture camera 121 and the infrared thermal imaging camera 122 are respectively configured to acquire visible light image data and infrared thermal image data in real time;

the processor 123 includes a detection module 123-1, a position correspondence module 123-2, and an information calculation module 123-3, wherein the detection module 123-1 stores the transparent object detection model, and is configured to input the visible light image data and the infrared thermal image data to the transparent object detection model, to acquire a visible light image transparent pixel identifier and an infrared thermal image transparent pixel identifier;

the position correspondence module 123-2 is configured to calculate three-dimensional point cloud information of each pixel marked by the infrared thermal image transparent pixel identifier of the infrared thermal image data in a coordinate system of the infrared thermal imaging camera; and the information calculation module 123-3 is configured to acquire, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object.

A coincidence degree of capture fields of view between the environment capture camera 121 and the infrared thermal imaging camera 122 is at least 80%. In this embodiment, the environment capture camera 121 is a visible light camera, the environment capture camera 121 is in frame synchronization with the infrared thermal imaging camera 122, and the two cameras synchronously capture external environment information. In this embodiment, the frame rates of the environment capture camera 121 and the infrared thermal imaging camera 122 are at least 30 Hz, and the precision can be satisfied if the resolution of the acquired image data is 640*480, and the higher the resolution is, the greater the time complexity of object detection is, which is not specifically limited herein.

It can be determined from the described embodiments that according to the image difference-based method and system for tracking a transparent object provided in some embodiments of the present disclosure, first by training a convolutional neural network based on sample data, to generate a transparent object detection model; then inputting visible light image data and infrared thermal image data acquired in real time to the transparent object detection model, to acquire a visible light image transparent pixel identifier and an infrared thermal image transparent pixel identifier; then calculating three-dimensional point cloud information of each pixel marked by the infrared thermal image transparent pixel identifier of the infrared thermal image data in a coordinate system of an infrared thermal imaging camera, thereby acquiring, according to the three-dimensional point cloud information, corresponding position coordinates of each pixel marked by the infrared thermal image transparent pixel identifier in the visible light image data, and fitting the position coordinates with the visible light image transparent pixel identifier, so as to acquire tracking information of the transparent object, and thus the transparent object can be detected and marked, and estimated depth values are assigned, and as the visible light image data and the infrared thermal image data are from different image features of the same scene and the same object, high-precision detection is achieved by acquiring two different image features and detecting a difference between the two features, so as to extract position information of the transparent object in a scene more precisely.

The image difference-based method and system for tracking a transparent object provided according to some embodiments of the present disclosure are described above by way of examples with reference to the accompanying drawings. However, a person skilled in the art should understand that for the described image difference-based method and system for tracking a transparent object provided in some embodiments of the present disclosure, various improvements can be made without departing from the content of some embodiments of the present disclosure. Therefore, the scope of protection of some embodiments of the present disclosure should be determined by the content of the appended claims.

The invention claimed is:

1. An image difference-based method for tracking a transparent object, comprising:
   training a convolutional neural network based on sample data, to generate a transparent object detection model;
   inputting visible light image data acquired in real time and infrared thermal image data acquired in real time to the transparent object detection model, to acquire a visible light image transparent pixel identifier and an infrared thermal image transparent pixel identifier;
   calculating three-dimensional point cloud information of each pixel marked by the infrared thermal image transparent pixel identifier, in the infrared thermal image data, wherein the three-dimensional point cloud information is in a coordinate system of an infrared thermal imaging camera; wherein the infrared thermal imaging camera is a camera for acquiring the infrared thermal image data; and
   acquiring, according to the three-dimensional point cloud information, corresponding position coordinates of each pixel, which is marked by the infrared thermal image transparent pixel identifier, in the visible light image data, and fitting the position coordinates with the visible light image transparent pixel identifier, to acquire tracking information of the transparent object.

2. The image difference-based method for tracking a transparent object according to claim 1, wherein
   the sample data is data collected by a head-mounted display, and the sample data comprises visible light image data and infrared thermal image data.

3. The image difference-based method for tracking a transparent object according to claim 1, wherein inputting the visible light image data acquired in real time and the infrared thermal image data acquired in real time to the transparent object detection model, to acquire the visible light image transparent pixel identifier and the infrared thermal image transparent pixel identifier comprises:
   detecting and determining each pixel in the visible light image data and each pixel in the infrared thermal image data based on the transparent object detection model, and if the pixel in the visible light image data and the pixel in the infrared thermal image data are determined as transparent object pixels, marking a transparent pixel identifier on the transparent object pixels; wherein
   the transparent pixel identifier on the visible light image data is the visible light image transparent pixel identifier; and
   the transparent pixel identifier on the infrared thermal image data is the infrared thermal image transparent pixel identifier.

4. The image difference-based method for tracking a transparent object according to claim 1, wherein before acquiring, according to the three-dimensional point cloud information, corresponding position coordinates of each pixel, which is marked by the infrared thermal image transparent pixel identifier, in the visible light image data, the method further comprises:
   acquiring calibration parameters between an environment capture camera and the infrared thermal imaging camera by camera calibration; wherein
   the environment capture camera is a camera for acquiring the visible light image data.

5. The image difference-based method for tracking a transparent object according to claim 4, wherein acquiring, according to the three-dimensional point cloud information, corresponding position coordinates of each pixel, which is marked by the infrared thermal image transparent pixel identifier, in the visible light image data comprises:
   acquiring a position relationship between each pixel marked by the infrared thermal image transparent pixel identifier and the infrared thermal imaging camera according to the three-dimensional point cloud information;
   acquiring a correspondence matrix between each pixel marked by the infrared thermal image transparent pixel identifier and the environment capture camera according to the position relationship and the calibration parameters, and acquiring three-dimensional information of the visible light image data in a coordinate system of the environment capture camera; and
   determining the position coordinates of each pixel, which is marked by the infrared thermal image transparent pixel identifier, in the visible light image data according to the correspondence matrix and the three-dimensional information.

6. The image difference-based method for tracking a transparent object according to claim 1, wherein after fitting the position coordinates with the visible light image transparent pixel identifier, to acquire tracking information of the transparent object, the method further comprises:
   locking a target region of the transparent object based on the tracking information; and
   performing rendering and superposing on the target region to complete tracking of the transparent object.

7. An image difference-based system for tracking a transparent object, and wherein the image difference-based system comprises a computer and an artificial reality interaction apparatus; wherein
   the computer is configured to train a convolutional neural network based on sample data, to generate a transparent object detection model; and
   the artificial reality interaction apparatus comprises an environment capture camera, an infrared thermal imaging camera and a processor, wherein the environment capture camera and the infrared thermal imaging camera are respectively configured to acquire visible light image data and infrared thermal image data in real time;
   the processor comprises a detection module, a position correspondence module and an information calculation module, wherein
   the detection module stores the transparent object detection model, and the detection module is configured to input the visible light image data acquired in real time and the infrared thermal image data acquired in real time to the transparent object detection model, to acquire visible light image transparent pixel identifier and infrared thermal image transparent pixel identifier;
   the position correspondence module is configured to calculate three-dimensional point cloud information of each pixel marked by the infrared thermal image transparent pixel identifier, in the infrared thermal image data, wherein the three-dimensional point cloud information is in a coordinate system of an infrared thermal imaging camera; and
   the information calculation module is configured to acquire, according to the three-dimensional point cloud information, corresponding position coordinates of each pixel, which is marked by the infrared thermal image transparent pixel identifier, in the visible light image data, and fit the position coordinates with the visible light image transparent pixel identifier, to acquire tracking information of the transparent object.

8. The image difference-based system for tracking a transparent object according to claim 7, wherein
a coincidence degree of capture fields of view between the environment capture camera and the infrared thermal imaging camera is at least 80%, and the environment capture camera is in frame synchronization with the infrared thermal imaging camera frame.

9. The image difference-based system for tracking a transparent object according to claim 8, wherein
the environment capture camera is a visible light camera.

10. The image difference-based system for tracking a transparent object according to claim 7, wherein the sample data is data collected by a head-mounted display, and the sample data comprises visible light image data and infrared thermal image data.

11. The image difference-based system for tracking a transparent object according to claim 7, the detection module is further configured to detect and determine each pixel in the visible light image data and each pixel in the infrared thermal image data based on the transparent object detection model, and if the pixel in the visible light image data and the pixel in the infrared thermal image data are determined as transparent object pixels, marking a transparent pixel identifier on the transparent object pixels; wherein the transparent pixel identifier on the visible light image data is the visible light image transparent pixel identifier; and the transparent pixel identifier on the infrared thermal image data is the infrared thermal image transparent pixel identifier.

12. The image difference-based system for tracking a transparent object according to claim 7, the processor is further configured to acquire calibration parameters between an environment capture camera and the infrared thermal imaging camera by camera calibration; wherein the environment capture camera is a camera for acquiring the visible light image data.

13. The image difference-based system for tracking a transparent object according to claim 12, the information calculation module is further configured to acquire a position relationship between each pixel marked by the infrared thermal image transparent pixel identifier and the infrared thermal imaging camera according to the three-dimensional point cloud information; acquire a correspondence matrix between each pixel marked by the infrared thermal image transparent pixel identifier and the environment capture camera according to the position relationship and the calibration parameters, and acquire three-dimensional information of the visible light image data in a coordinate system of the environment capture camera; and determining the position coordinates of each pixel, which is marked by the infrared thermal image transparent pixel identifier, in the visible light image data according to the correspondence matrix and the three-dimensional information.

14. The image difference-based system for tracking a transparent object according to claim 7, the information calculation module is further configured to lock a target region of the transparent object based on the tracking information; and perform rendering and superposing on the target region to complete tracking of the transparent object.

* * * * *